(12) United States Patent
Frost et al.

(10) Patent No.: US 8,178,177 B2
(45) Date of Patent: May 15, 2012

(54) DUCT WRAP AND METHOD FOR FIRE PROTECTING A DUCT

(75) Inventors: George W. Frost, Afton, MN (US); John T. Brady, Lino Lakes, MN (US); Brandon L. Cordts, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1131 days.

(21) Appl. No.: 11/057,277

(22) Filed: Feb. 11, 2005

(65) Prior Publication Data

US 2006/0182915 A1    Aug. 17, 2006

(51) Int. Cl.
*C04B 26/00* (2006.01)
*C04B 26/32* (2006.01)

(52) U.S. Cl. ....... 428/34.5; 138/145; 138/154; 156/154; 156/323; 428/35.2; 428/35.3; 428/35.5

(58) Field of Classification Search ............... 422/179; 442/138, 101, 59; 428/446, 920, 921, 34.6, 428/34.1, 100, 374, 388; 425/345; 156/250, 156/62, 306.9, 307, 307.7; 52/232, 309.1; 523/179; 521/149, 154; 405/157, 216
See application file for complete search history.

(56) References Cited

U.S. PATENT DOCUMENTS

| 3,458,329 | A |   | 7/1969  | Owens et al. |         |
|-----------|---|---|---------|-----------|---------|
| 3,916,057 | A | * | 10/1975 | Hatch et al. | 442/414 |
| 4,265,953 | A |   | 5/1981  | Close |         |
| 4,276,332 | A |   | 6/1981  | Castle |         |
| 4,305,992 | A |   | 12/1981 | Langer et al. |         |
| 4,513,173 | A |   | 4/1985  | Merry |         |
| 4,632,885 | A |   | 12/1986 | Tzur |         |
| 4,756,945 | A |   | 7/1988  | Gibb |         |
| 5,079,280 | A | * | 1/1992  | Yang et al. | 523/179 |
| 6,048,805 | A |   | 4/2000  | Gottfried |         |
| 6,224,835 | B1 | * | 5/2001 | Langer | 422/179 |
| 6,698,146 | B2 |   | 3/2004 | Morgan et al. |         |
| 2003/0082972 | A1 |   | 5/2003 | Monfalcone, III et al. |   |
| 2004/0121152 | A1 | * | 6/2004 | Toas | 428/374 |

FOREIGN PATENT DOCUMENTS

FR    842585    6/1939

(Continued)

OTHER PUBLICATIONS www.insulfrax.com/files/Insulfrax-Marine-Blanket.pdf Jul. 2003 Unifrax.*

(Continued)

*Primary Examiner* — Rena Dye
*Assistant Examiner* — Ellen S Wood
(74) *Attorney, Agent, or Firm* — Kenneth B. Wood

(57) ABSTRACT

An article for fire protecting a duct includes a first layer of a first material including a noncombustible fibrous material and a second layer of a second material including an intumescent material. The first layer is adjacent the second layer. The article is non-self-supporting and has an initial thickness of less than about three inches when in a first application condition, and an expanded thickness when in a second heated condition. The expanded thickness is greater than the initial thickness. At the expanded thickness, the article meets Section 5.5 of AC101 Acceptance Criteria for Grease Duct Enclosure Assemblies, as specified in April 2001 by the International Council of Building Officials (ICBO-ES).

22 Claims, 3 Drawing Sheets

FOREIGN PATENT DOCUMENTS

WO      WO 00/17120      3/2000

OTHER PUBLICATIONS www.fyrewrap.com/files/Fyrewrap-MAX-Duct-Wrap-Insulation. pdf Mar. 2004 Unifrax.*

Product Data, "3M FireMaster FastWrap", 3M, St. Paul, MN; 1999 (4 pages).
Material Safety Data Sheet, "3M Fire Barrier Firemaster Fastwrap"; 3M, St. Paul, MN; Jun. 2, 1999 (6 pages).
Product Information, "Thermal Ceramics Kaowool 333-E Paper"; Morgan Crucible plc, Bromborough, UK, undated (2 pages).

* cited by examiner

DUCT WRAP AND METHOD FOR FIRE PROTECTING A DUCT

CROSS-REFERENCE TO RELATED APPLICATION(S)

None.

BACKGROUND OF THE INVENTION

The present invention relates to an article and method for fire protecting a duct. More specifically, the present invention relates to an article for fire protecting a fire-rated duct, where the article contains an intumescent material, and has an initial thickness of less than about three inches when in a first application condition and an expanded thickness when in a second heated condition, where the expanded thickness is greater than the initial thickness.

Fire-rated ducts are found in many commercial, industrial, and residential applications, including kitchen grease ducts, chemical exhaust ducts, heating, ventilation, and air conditioning ducts, and any general purpose supply or exhaust ducts. A fire-rated duct may be wrapped with a fire-protecting, noncombustible material to create a fire-resistant barrier around the duct. If a fire begins inside the duct, the fire-resistant barrier helps to contain the fire within the duct, so that the fire does not spread to a structure surrounding the duct. The fire-protecting materials are commonly called "fire wraps", "duct wraps", "fire-protecting sheets", "fire-protecting blankets", or generally, "fire-protecting articles".

Conventional fire-protecting articles for ducts utilize multiple layers of fibers, such as glass, mineral, or ceramic fibers, or blends thereof. With a conventional fire-protecting article, two layers of an approximately two-inch thick fire-protecting article are needed in order for the duct protection to pass the applicable fire tests. One of the most rigorous tests a fire-protecting article must pass is the AC101 Acceptance Criteria for Grease Duct Enclosure Assemblies, as specified by the International Council of Building Officials (ICBO, which is now a part of ICC Evaluation Service, Inc.) in April 2001. In Section 5.5 of the AC101 criteria, a sample of a fire-protecting article is exposed to a furnace that is exerting a heat of approximately 2000 degrees Fahrenheit (° F.) for about 30 minutes. The fire-protecting article sample must be able withstand the 2000° F. heat. That is, the fire-protecting article sample must not combust, and the temperature measured at an outermost portion of the fire-protecting article (the portion of the fire-protecting article furthest from the furnace) must not exceed 325° F. plus the ambient temperature. In Section 5.4 of the AC101 criteria, a sample of the fire-protecting article is exposed to a furnace that is exerting a heat of approximately 500° F. for about four hours. The temperature measured at an outermost portion of the fire-protecting article (the portion of the fire-protecting article furthest from the furnace, which is also known as the "cold side") must not exceed 117° F. plus the ambient temperature. It has been found that with conventional fire-protecting articles, two layers of the fire-protecting article (for a total of approximately four inches of fire-protecting article) are needed in order for the temperature at the outermost portion of the fire-protecting article to remain at or below about 325° F. plus the ambient temperature in the Section 5.5 test and at or below about 117° F. in the Section 5.4 test.

The fire-protecting article is usually installed between the duct and the surrounding structure. Oftentimes, the space between the duct and surrounding structure is only large enough to fit the conventional fire-protecting article. Because of the tight working space, it may be difficult to install the conventional fire-protecting article. Furthermore, when two layers of the conventional fire-protecting article are used, the installation process may be burdensome.

BRIEF SUMMARY OF THE INVENTION

In a first aspect, the present invention is an article for fire protecting a duct, where the article includes a first layer of a first material including a noncombustible fibrous material and a second layer of a second material including an intumescent material. The first layer is adjacent the second layer. The article is non-self-supporting and has an initial thickness of less than about three inches when in a first application condition, and an expanded, reactive thickness when in a second heated condition. The expanded thickness is greater than the initial thickness. At the expanded thickness, the article meets Section 5.5 of AC101 Acceptance Criteria for Grease Duct Enclosure Assemblies, as specified in April 2001 by the International Council of Building Officials.

In a second aspect, the present invention is a non-self-supporting sheet for fire protecting a duct, where the sheet includes a noncombustible fibrous material and an intumescent material dispersed throughout the noncombustible fibrous material. The sheet has an initial thickness of less than about three inches when in a first application condition, and has a reactive thickness that is greater than the initial thickness when in a second heated condition.

In a third aspect, the present invention is a material for forming a fire-protecting article, where the material includes about 0 to about 70 percent by weight of fiberglass, about 0 to about 70 percent by weight of ceramic fibers, and about 30 to about 50 percent by weight of graphite. The fiberglass, ceramic fibers, and graphite define a layer of the material. The material has an installed thickness of less than about three inches and has, upon heating to a temperature ranging from about 500 degrees Fahrenheit to about 1200 degrees Fahrenheit, an expanded thickness that is greater than the installed thickness.

In a fourth aspect, the present invention is a non-self-supporting article for fire protecting a duct, where the non-self-supporting article includes a first layer of a first noncombustible fibrous material and a second layer of a second noncombustible fibrous material interspersed with an intumescent material. The first layer is adjacent the second layer. The non-self-supporting article has a first thickness of less than about inches at an ambient temperature, and a second thickness that is greater than the initial thickness at a temperature in a range of about 500 degrees Fahrenheit to about 1200 degrees Fahrenheit.

In a fifth aspect, the present invention is a duct wrap formed of a layer of a noncombustible fibrous material, where a single layer of the duct wrap has an installed thickness of less than about three inches and meets Sections 5.4 and 5.5 of AC101 Acceptance Criteria for Grease Duct Enclosure Assemblies, as specified in April 2001 by the International Council of Building Officials.

In a sixth aspect, the present invention is a duct wrap including an intumescent material, where a single layer of the duct wrap weighs less than about 2.2 pounds per square foot and has an effective thermal thickness of greater than or equal to about 3.5 inches.

In a seventh aspect, the present invention is a duct assembly including a duct and a non-self-supporting fire-protecting article fitted around the duct. The article includes a noncombustible fibrous material and an intumescent material. The article has an initial thickness of less than about three inches when in a first application condition and a reactive thickness greater than the initial thickness when in a second heated condition.

In an eighth aspect, the present invention is a method of fire protecting a duct. The method includes fitting a fire-protecting article around the duct in a single layer having a thickness of less than about three inches and securing the fire-protecting article to the duct. The fire-protecting article includes a noncombustible fibrous material and an intumescent material dispersed throughout the fibrous material. The single layer of the fire-protecting article meets Sections 5.4 and 5.5 of AC101 Acceptance Criteria for Grease Duct Enclosure Assemblies, as specified in April 2001 by the International Council of Building Officials.

In a ninth aspect, the present invention is a method of forming an article for fire protecting a duct. The method includes providing a layer of a noncombustible fibrous material having a first thickness, applying a binder on the fibrous material, dispersing an intumescent material onto the fibrous material and binder; and needling the fibrous material and intumescent material to form a layer having a second thickness of less than or equal to about one-half of an inch.

The above summary of the present invention is not intended to describe each disclosed embodiment or every implementation of the present invention. The figures and the detailed description that follow more particularly exemplify illustrative embodiments.

BRIEF DESCRIPTION OF THE DRAWINGS

The present invention will be further explained with reference to the drawing figures listed below, where like structure is referenced by like numerals throughout the several views.

Figure 1A:
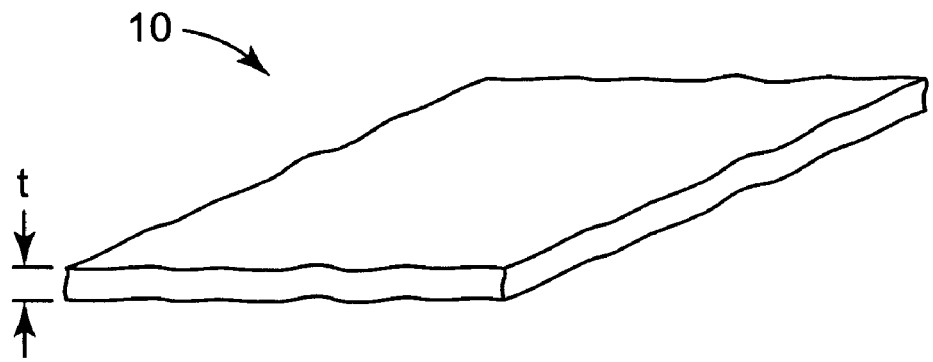
FIG. 1A shows an example of a structure of a fire-protecting article of the present invention.

While the above-identified figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION

The present invention is an article for fire protecting a fire-rated duct and a method for fire protecting a duct using the article, where the article contains a noncombustible fibrous material and an intumescent material. The article has an initial thickness of less than about three inches when in a first application condition and an expanded thickness when in a second heated condition, wherein the expanded thickness is greater than the initial thickness. Preferably, the initial thickness is about one inch to about two inches and the expanded thickness is greater than or equal to about 3.5 inches. Even more preferably, the expanded thickness is between about 3.5 inches to about five inches. The intumescent material expands in response to an intense heat, which enables the fire-protecting article to expand in response to a heated condition of the duct. The expanded fire-protecting article creates a larger volume of space in which the fire-protecting article may trap heat, increasing its thermal insulation capability. With an increased thermal insulation capability, the expanded fire-protecting article may help slow the passage of heat from one side of the article to the other (i.e., from the "hot side" to the "cold side" of the fire protecting article). When used on a duct, the fire-protecting article may help prevent a structure surrounding the duct from becoming overheated and possibly catching on fire if a fire or other intense heat is present inside the duct.

The expansion of the fire-protecting article from an initial (also known as an "applied" or "installed") thickness of less than about three inches, preferably about one inch to about two inches, to an expanded, "effective" (or "reactive") thickness, which is greater than the initial thickness, allows the article to have an advantage of being applied in a layer that is thinner than conventional fire-protecting articles and yet have substantially similar fire-protecting capabilities. It is preferred that a fire-protecting article in accordance with the present invention weigh less than about 2.2 pounds per square foot while at the same time having an effective thermal thickness of greater than or equal to about 3.5 inches. In some instances, such as where there is little clearance between a duct and its surrounding structure, it may be desirable to have only one layer of fire-protecting article. Furthermore, the installation time may be reduced if only one layer of fire-protecting article is required. Other advantages to having only one layer of fire-protecting article includes reduced exposure to fibers, which may irritate the installers, as well as reduced cost from using less of the fire-protecting article.

In addition to Sections 5.4 and 5.5 of AC101 Acceptance Criteria for Grease Duct Enclosure Assemblies, it is also preferred that a single layer of a fire-protecting article meet the requirements of Underwriters Laboratories ("UL") Standard 2221 (as specified in 2003), Section 12 of UL Standard 1978 (second edition, as specified on Jun. 25, 2002), American Society for Testing and Materials ("ASTM") E84-04 (as specified in 2004), ASTM E119 (as specified in 2000), ASTM E136-04 (as specified in 2004), ASTM E814-02 (as specified in 2002), ASTM E2336 (as specified in 2004), and International Organization for Standardization ("ISO") 6944 (first edition, as specified in December 1985). The aforementioned requirements limit the combustibility, surface flammability, and smoke generation potential of various types of duct wraps. The aforementioned list of requirements is not intended to be exhaustive.

UL Standards 1978 and 2221 are internal grease duct fire tests that set criteria for the fire resistivity of grease duct enclosure assemblies. The UL Standards are similar to Sections 5.4 and 5.5 of the AC101 criteria, where a grease duct enclosure assembly is subjected to standard internal and external fire exposures for a specified time period and a temperature near or on the surface of the fire-protecting article spaced from the grease duct ("cold side") is measured. In the UL Standard 1978, a specimen (e.g., fire-protecting article) is exposed to a furnace exerting a heat of 500° F. for about four hours. The cold side of the specimen must not exceed 117° F. plus the ambient temperature. In UL 1978, the specimen must not combust.

ASTM E84-04 is a standard for surface burning characteristics and is applicable to exposed surfaces, such as walls and ceilings, and tests the relative burning behavior of material. ASTM E84-04 is conducted with a specimen in the ceiling position with the surface to be evaluated exposed face down to the heat source. The material, product, or assembly should be capable of being mounted in the test position during the test and so, the specimen should either be self-supporting by its own structural quality, held in place by added supports along the test surface, or secured from the back side. ASTM E119 is applicable to structural units that constitute permanent integral parts of a finished building. ASTM E119 is used to measure and describe the response of materials, products, or assemblies to heat and flame under controlled conditions. In the ASTM E119 standard, a specimen is exposed to a temperature of up to 1850° F. ("fire exposure") for up to two hours. The cold side of the specimen must not exceed 325° F. plus the ambient temperature and the specimen must not combust. Also in the ASTM E119 standard, a duplicate specimen faces a fire exposure for about one hour, and then the specimen is immediately subjected to a 30 pounds per square inch (psi) hose stream which is directed at its middle first, and then at all parts of the exposed face for a specified period of time. The purpose of the hose stream test is to determine whether the specimen can withstand lateral impact from falling debris during the fire endurance period.

ASTM E136-04 is another fire-test response standard for measuring and describing the response of materials and product assemblies to heat and flame under controlled conditions. In the ASTM E136-04 standard, the behavior of a specimen in a vertical tube furnace exerting a 750° F. heat is studied. ASTM E814-02 is applicable to through-penetration fire stops intended for use in openings in fire-resistive walls and floors. ASTM E814-02 measures the resistance of fire stops to an external force. Similar to Section 5.5 of the AC101 criteria and the ASTM E119, a specimen is exposed to a temperature of up to 1850° F. for up to two hours, and the cold side of the specimen must not exceed 325° F. plus the ambient temperature, and the specimen must not combust. The ASTM E814-02 standard also uses a hose stream test similar to the ASTM E119 standard. ASTM E2336 tests grease duct enclosure systems and materials for noncombustibility, fire resistance, durability, internal fire, and fire-engulfment with a through-penetration fire stop.

ISO 6944 sets forth criteria for vertical and horizontal ducts under standardized fire conditions. The general purpose of ISO 6944 is to measure a ventilation duct's ability to resist the spread of fire from one fire compartment to another without the aid of fire dampers.

Figure 1B:
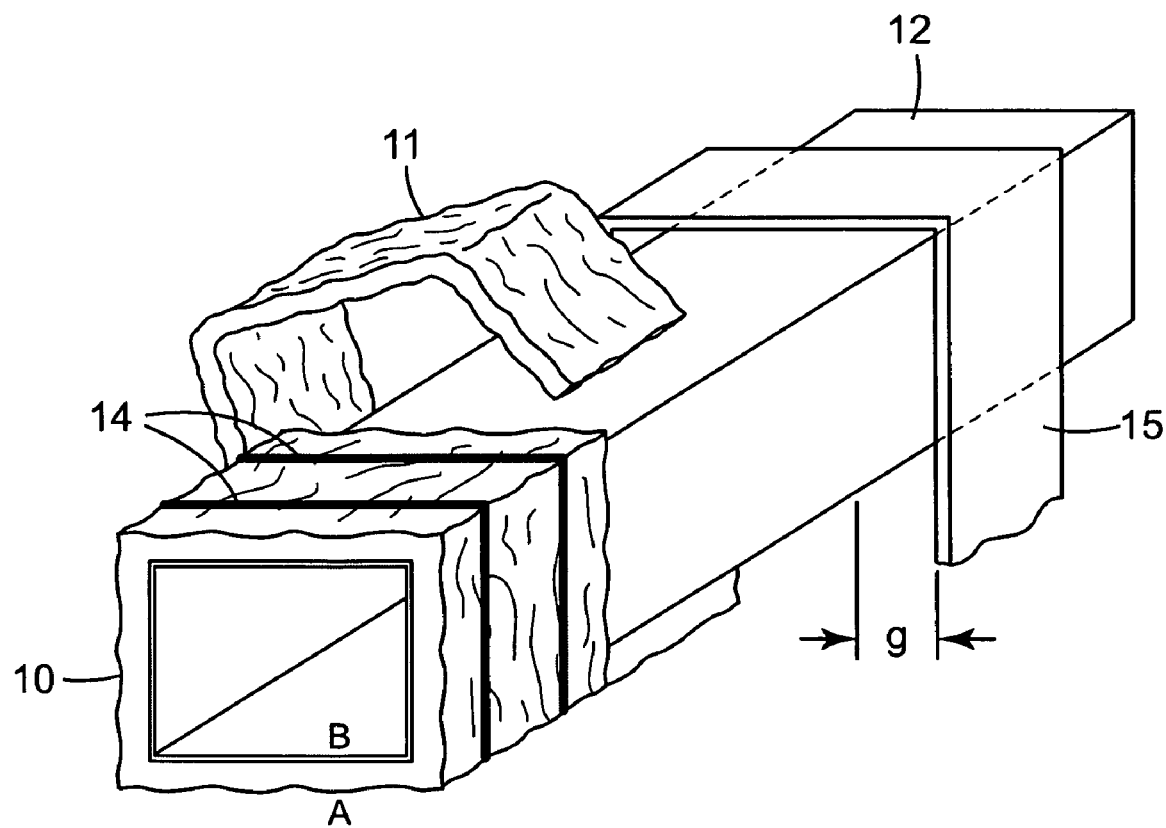
FIG. 1B shows an example of a process for wrapping a fire-protecting article of the present invention around a duct.

FIG. 1A shows an example of a general structure of fire-protecting article 10 of the present invention. Fire-protecting article 10 is a flexible, non-self-supporting layer or sheet of material for fire protecting a duct and includes a noncombustible fibrous material and an intumescent material. As FIG. 1B shows, fire-protecting article 10 is flexible enough to wrap around duct 12. A non-self-supporting article is an article that lacks the rigidity to support itself, and thus requires some form of separate supporting framework. Fire-protecting article 10 is non-self-supporting because, while it can be made to conform to a separate supporting framework, such as duct 12 of FIG. 1B, it requires a securing mechanism, such as straps or pins, to hold it in place. As a non-self-supporting article, fire-protecting article 10 may be used in many different applications, such as with different sized ducts. Fire-protecting article 10 is any article used to fire protect a fire-rated duct, and may also be known as a "fire wrap", "duct wrap", "fire-protecting sheet" or "fire-protecting blanket".

As stated, FIG. 1B shows an example of a process for wrapping fire-protecting article 10 of the present invention around duct 12. Fire-protecting article 10 is fitted around duct 12 and secured with straps 14. Straps 14 may be formed of stainless steel or any material having a high melting point so that if a fire or other intense heat is inside duct 12, each strap 14 will not begin failing until its high melting point is reached and fire-protecting article 10 will remain secured to duct 12 longer than if straps 14 had a low melting point. The type of securing mechanism is not essential to the present invention, and those skilled in the art may select an alternative securing mechanism to secure fire-protecting article 10 to duct 12, such as steel pins.

Duct 12 may be any type of duct that requires fire protection, such that if a fire or another form of intense heat is inside duct 12, the fire or heat is contained within duct 12 and does not spread to surrounding structure 15. Surrounding structure 15 may catch on fire if an intense heat were to spread to structure 15 from duct 12. Conversely, if an external fire engulfs duct 12 from the outside, it may be desired to fire protect duct 12 to help prevent the fire from reaching the inside of duct 12. Examples of ducts that fire-protecting article 10 may be used to fire protect include, but are not limited to, kitchen grease ducts, chemical exhaust ducts, heating, ventilation, and air conditioning ducts, and any general purpose supply or exhaust ducts.

As FIG. 1B shows, it is preferred that fire-protecting article 10 fit substantially around duct 12 such that most or all of duct 12 is covered by fire-protecting article 10. Those skilled in the art may modify how fire-protecting article 10 is wrapped around duct 12. For example, a "checkerboard" wrapping method may also be used. Fire-protecting article 10 is installed in a thickness that is less than about three inches, and is preferably about one inch to about two inches. A thickness is measured in direction t as shown on FIG. 1A. A desired thickness of an installed fire-protecting article 10 will differ depending upon a thermal conductivity of fire-protecting article 10. Thermal conductivity (Watts/meter ° Celsius) is a property of materials that expresses the heat flux (Watt/meters$^2$) that will flow through the material if a certain temperature gradient (° Celsius/meter) exists over the material. Essentially, a thermal conductivity value represents how fast heat is transferred through fire-protecting article 10, which will depend upon the temperature that fire-protecting article 10 is exposed to and the type of material used to form fire-protecting article 10 (which will be discussed in further detail in reference to FIGS. 2-4 below). A low thermal conductivity is desired. The higher the thermal conductivity at high temperatures, the thicker fire-protecting article 10 should be formed.

Fire-protecting article 10 may be installed between duct 12 and surrounding structure 15. Surrounding structure 15 is shown in FIG. 1B to be surrounding only a part of duct 12, but surrounding structure 15 may also enclose most or all of duct 12. An installation thickness that is smaller than conventional duct wraps may make fire-protecting article 10 easier to install. Oftentimes, the gap g between duct 12 and surrounding structure 15 is only large enough to fit a conventional fire-protecting article. With those tight working spaces, a thinner fire-protecting article 10 is probably preferred because it will free-up more room for an installer to work with. It is also preferred that a fire-protecting article in accordance with the present invention be installed in a configuration such that it has room to expand. If a fire-protecting article is installed such that it abuts two fixed surfaces, the fire-protecting article would probably have little or no room to expand. An expanded thickness is required for a single layer of fire protecting article 10 to meet the various standards set forth in Section and 5.5 of the AC101 Acceptance Criteria for Grease Duct Enclosure Assemblies, UL Standards 2221 and 1978, ASTM E84-04, ASTM E119, ASTM E136-04, ASTM 814-02, ASTM E2336, IMO A754, and ISO 6944.

Although more than one layer of fire-protecting article 10 may be used to fire protect duct 12, it is preferred that only one layer of fire-protecting article 10 be used. If only one layer is used, installation time may be decreased and costs of fire protecting duct 12 may be lowered because less product may be used. With fire-protecting article 10 of the present invention, it may be possible to fire protect duct 12 with only one layer because fire-protecting article 10 expands such that its "effective" thermal thickness is at greater than its installed thickness. An "effective" thermal thickness is a thickness of fire-protecting article 10 after it is substantially fully expanded when in a heated condition. A heated condition preferably occurs when fire-protecting article 10 is exposed to a temperature in a range of about 500° F. to about 1200° F. It is even more preferred that fire-protecting article 10 reach its effective thickness as soon after it is exposed to a temperature of greater than about 500° F. An "effective" thickness may also be substantially equal to a thickness necessary for a prior art fire-protecting article to pass the rigorous fire tests known in the art. For example, with a 3M Fire Barrier Duct Wrap, which is commercially available from 3M Company, St. Paul, Minn., approximately two layers of two inch prior art fire-protecting articles are currently needed to meet the rigorous fire tests and standards. The effective thickness may also be known as a "reactive" or "expanded" thickness. The effective, reactive, or expanded thicknesses are greater than the initial thickness. The applied or initial thickness is the thickness of fire-protecting article 10 prior to being exposed to an intense heat.

The effective thickness is an important dimension because fire-protecting article 10 must be thick enough to keep the temperature on side A ("cold side") of fire-protecting article 10 (the side furthest from the inside of duct 12) at a temperature low enough to pass certain fire tests, such as Section 5.5 of the AC101 Acceptance Criteria for Grease Duct Enclosure. Side A is the "cold-side" only if the fire (or other heat source) is within duct 12. Side B would be considered the "cold-side" if an external fire engulfs duct 12 from the outside. As stated earlier, in Section 5.5 of the AC101 test, a sample of fire-protecting article 10 is exposed to a furnace that is exerting a heat of approximately 2000° F. for about 30 minutes. The sample of fire-protecting article 10 must be able with stand the 2000° F. heat. That is, the sample of fire-protecting article 10 must not combust, and the temperature measured at side A of fire-protecting article 10 must not exceed 325° F. plus the ambient temperature. It has been found that with a conventional fire-protecting article, two layers of the article (for a total of approximately four inches of the fire-protecting article outside the duct) are needed in order for the temperature at the outermost portion of the fire-protecting article to remain at or below 325° F. plus the ambient temperature.

In the present invention, only one layer of fire-protecting article 10 (where one layer is less than about three inches thick) is necessary to pass Sections 5.4 and 5.5 of the AC101 test, where the single layer has an applied (or initial) thickness less that about three inches. Only one layer having a thickness of less than three inches is necessary because the intumescent material in fire-protecting article 10 expands in volume in reaction to a heated condition, thus expanding the thickness of fire-protecting article 10, such that the one layer of fire-protecting article 10 has an effective (or expanded or reactive) thickness greater than the applied thickness. Specifically, it is preferred that fire protecting article 10 meet Section 5.4 of the AC101 test at its initial thickness of about less than three inches, and meet Section 5.5 of the AC101 test at its expanded thickness.

Duct 12 may be formed of many pieces attached together in a longitudinal direction so that there are laterally-extending seams between each piece. If duct 12 warps from a fire or other form of heat inside duct 12, the seams between duct 12 pieces may separate. This may be hazardous because it may provide a channel for the fire or other heat source contained in duct 12 to spread to surrounding structure 15. If fire-protecting article 10 begins to expand in response to the fire or other heat source, fire-protecting article may fill in the void formed by the separated seams in duct 12.

As FIG. 1B shows, a method for fire protecting a duct in accordance with the present invention includes first fitting fire-protecting article 10 around the duct in a single layer having a thickness of less than about three inches. Fire-protecting article 10 is then secured to the duct using stainless steel straps 14 or another securing mechanism, such as copper-coated steel pins. Those skilled in the art may modify the type of securing mechanism. Fire-protecting article 11 is in a mid-wrap position and is shown to illustrate how fire-protecting article 11 may be wrapped around duct 12. Duct 12 may be completely or partially enclosed by surrounding structure 15.

Figure 1C:
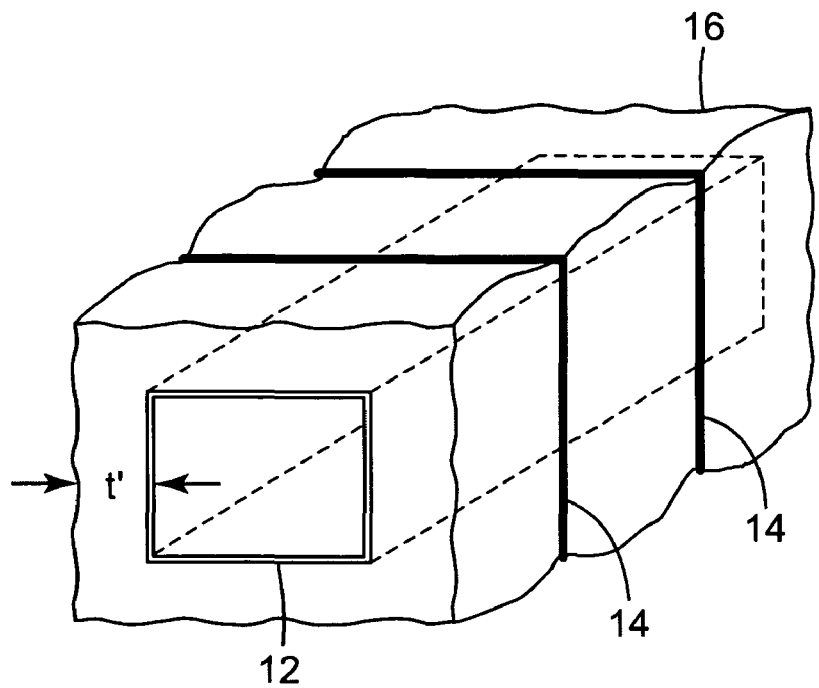
FIG. 1C shows an expanded fire-protecting article in accordance with the present invention.

FIG. 1C shows expanded fire-protecting article 16 in accordance with the present invention. Expanded fire-protecting article 16 is fire-protecting article 10 of FIG. 1B after it has been exposed to a high temperature. Specifically, the inside of duct 12 is elevated to a high temperature, which causes the intumescent material to expand in volume, thus expanding fire-protecting article 10. The "high temperature" (or "intense heat") intumescent material 26 begins expanding at depends upon the type of intumescent material 26 used. It is preferred that the intumescent material inside fire-protecting article 10 expands to its maximum volume at a temperature in a range of about 700° F. to about 1200° F. The thickness of expanded fire-protecting article 16 is an effective thickness of fire-protecting article 10. As discussed earlier, the effective thickness is greater than the applied thickness, and is preferably greater than or equal to about 3.5 inches. Expanded fire-protecting article 16 does not expand fully where it is secured to duct 12 by straps 14. Fire-protecting article 16 may also be overlapped where it is secured under straps 14 in order to get a higher-level of fire-protecting where fire-protecting article 16 may not fully expand. However, expanded fire-protecting article 16 may expand fully where it is secured to duct 12, depending on the type of securing mechanism used, such as a pin or clip combination.

Figure 2:
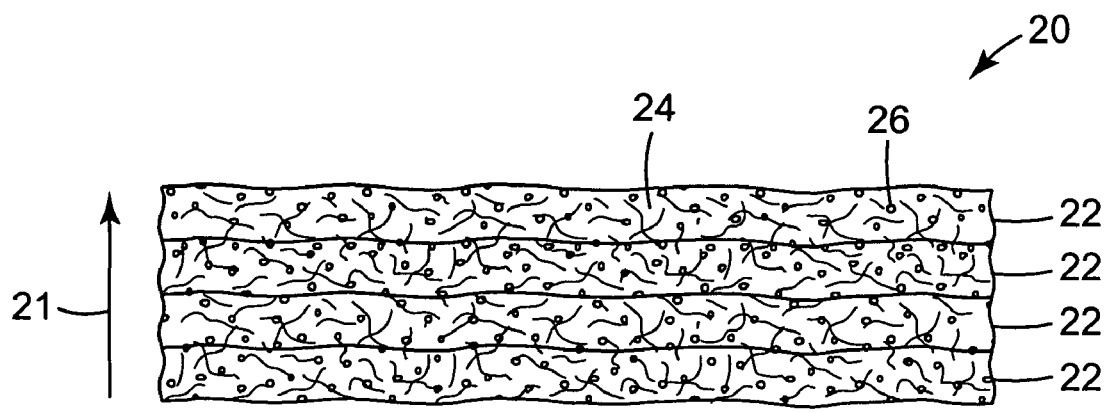
FIG. 2 shows a first exemplary embodiment of the present invention.

FIG. 2 shows a first exemplary embodiment of the present invention. Fire-protecting article 20 is formed of four layers 22 that are each approximately one-half of an inch thick. A thickness is measured in the direction shown by arrow 21 in FIG. 2. Although the first exemplary embodiment shown in FIG. 2 shows fire-protecting article 20 having four layers 22, a fire-protecting article in accordance with the present invention may have any number of layers of any thickness, so long as the total initial thickness of fire-protecting article 20 is less than about three inches, and so long as fire-protecting article 20 meets the various UL, ASTM, ICBO, and ISO criteria and standards discussed earlier. Furthermore, each layer 22 does not need to be the same thickness. Layers 22 are comprised of noncombustible fibrous material 24 and intumescent material 26.

Intumescent material 26 is dispersed throughout fibrous material 24. In FIG. 2, intumescent material 26 is dispersed throughout fibrous material 24 in each layer 22. Intumescent material 26 may be dispersed uniformly or without regard to uniformity. However, in the present invention, intumescent material 26 may also be dispersed in a gradient, where each layer may have a different amount intumescent material 26 or where intumescent material 26 is dispersed in a gradient within each layer (i.e., the amount of intumescent material 26 differs within each layer). Intumescent material 26 may also be formed in a discrete layer (where intumescent material 26 is not dispersed throughout a fibrous material, but is concentrated in one layer). These alternate exemplary embodiments are discussed in reference to FIGS. 3 and 4 below. It may be preferred to have intumescent material 26 dispersed throughout fibrous material 24 in order to give fire-protecting article 20 a higher level of integrity. That is, when intumescent material 26 is dispersed throughout fibrous material 24 and intumescent material 26 expands, the fibers of fibrous material 24 in each layer 22 may stretch apart, thus expanding fibrous material 24.

Fibrous material 24 may be the same fibrous material throughout layers 22, or each layer 22 may use a different fibrous material 24. Fibrous material 24 may be any fibrous material that is noncombustible, where "noncombustible" means the material meets the criteria of ASTM E136-04 and/or ASTM E84-04 and/or ASTM E176. It is also preferred that fibrous material 24 have a melting point of greater than or equal to 600° F. Fibrous material 24 may be organic, inorganic, or blends thereof. Examples of fibrous material 24 that may be used in accordance with the present invention include, but are not limited to, mineral fibers, fiberglass, ceramic fibers, or blends thereof. It is preferred, but not required, that fibrous material in accordance with the present invention have the following thermal conductivity values at the corresponding temperatures:

TABLE 1

Preferred Thermal Conductivity Values For Fibrous Material

| Temperature (° F.) | Thermal Conductivity (Watts/meter ° Celsius) |
|---|---|
| 500 | 0.2–0.3 |
| 1000 | 0.5–0.6 |
| 1500 | 1.4–1.7 |
| 2000 | 2.9–3.6 |

Intumescent material 26 is any fire resistant material that expands in volume when exposed to a certain temperature above ambient. In the present invention, it is preferred that intumescent material 26 begin to expand at a temperature of in a range of about 320° F. to about 500° F. (the "onset temperature") and have a fully expanded volume at a temperature in a range of about 500° F. to about 1200° F. Intumescent material 26 should expand and char when exposed to intense heat, but not combust. Fire-protecting article 20 has a greatest thermal insulating capability when intumescent material 26 is fully expanded. If fire-protecting article 20 is to be used as a grease duct wrap, it must meet Section 5.5 of the AC101 Acceptance Criteria for Grease Duct Enclosure Assemblies (in addition to the other standards mentioned above), thus for grease duct applications, it is preferred that fire-protecting article 20 begin to attain its fully expanded volume as soon as possible after fire-protecting article 20 is exposed to a 500° F. heat for four hours.

It is preferred that fire-protecting article 20 include at least about 20 percent (%) to about 80% by weight of intumescent material 26. It is even more preferred that fire-protecting article 20 include at least about 25% to about 45% by weight of intumescent material 26. The amount of intumescent material 26 that should be used in fire-protecting article 20 depends upon the expansion capability of the type of intumescent material used and the desired amount of expansion desired. Examples of intumescent material 26 that may be used in accordance with the present invention include, but are not limited to, graphite, sodium silicate, vermiculite, and blends thereof. A specific example of graphite that may be used with the present invention is a product marketed commercially under the Grafguard trademark by GrafTech International Limited of Wilmington, Del. Graphite is a preferred intumescent material because of its relatively high melting point, relatively low weight, and relatively better expansion, as compared to other intumescent materials.

When intumescent material 26 begins to char and expand in volume at a temperature in a range of preferably about 320° F. to about 500° F., fire-protecting article 20 begins to expand from its applied thickness toward its effective thickness. The temperature at which intumescent material 26 begins to char and expand will differ depending upon the type of intumescent material 26 used. For example, if Grafguard 160C is used, intumescent 110 material 26 will begin to char and expand at a temperature in a range of about 320° F. to about 428° F. The expansion of fire-protecting article 20 creates a larger volume of space in which fire-protecting article 20 may trap heat, increasing its thermal insulation capability. As stated earlier, it is preferred that intumescent material 26 reach its maximum volume, and thus fire-protecting article 20 reach its effective thickness, at a temperature in a range of about 500° F. and about 1200° F.

A fire-protecting article in accordance with the present invention may be formed by first forming individual layers, which will be stitched together to form the fire-protecting article. For example, for fire-protecting article 20 of FIG. 2, where each layer 22 is the same, layer 22 of fire-protecting article 20 may be formed by first blending mineral fibers and glass fibers for the noncombustible fibrous material 24. Any other suitable fiber blend or single type of noncombustible fiber may be used. The fiber blend 24 is then distributed onto a polypropylene scrim and then weighed out to a desired amount. Any other type of scrim known in the art may also be used. The size of the scrim will depend upon the preferred size of fire-protecting article 20. For example, if it is preferred that fire-protecting article be two feet by a four feet, a scrim having similar dimensions may be used. A scrim does not necessarily have to be used, and a flat surface, such as a continuous rolling belt or carrier mat in a manufacturing process may also be used.

Next, a binder is applied to the fibrous material. The binder may be organic, inorganic, or blends thereof. An example of an organic binder that may be used is a 3M Company Spray 77. Adhesive, which is commercially available from 3M Company, St. Paul, Minn. After the binder is applied, intumescent material 26 is dispersed onto fibrous material 24 and the binder. The binder acts to bind intumescent material 26 to fibrous material 24. The binder may be in a fiber form, but it is not required. Fibrous material 24 may then be randomized to vary the direction of the individual fibers. Finally, fibrous material 24 and intumescent material 26 are needled using needling methods known in the art to form layer 22 of FIG. 2. The polypropylene scrim may be removed after the stitching process. The scrim is used to hold the materials together during the needling process. The resulting layers formed from this method may be stitched together using a stitching process known in the art. In a suitable embodiment, fire-protecting article 20 includes about 0% to about 70% by weight of fiberglass, about 0% to about 70% by weight of mineral fibers, and about 30% to about 50% by weight of graphite. In another suitable embodiment, fire-protecting article 20 includes about 0% to about 70% by weight of fiberglass, about 0% to about 70% by weight of ceramic fibers, and about 30% to about 50% by weight of graphite.

Figure 3:
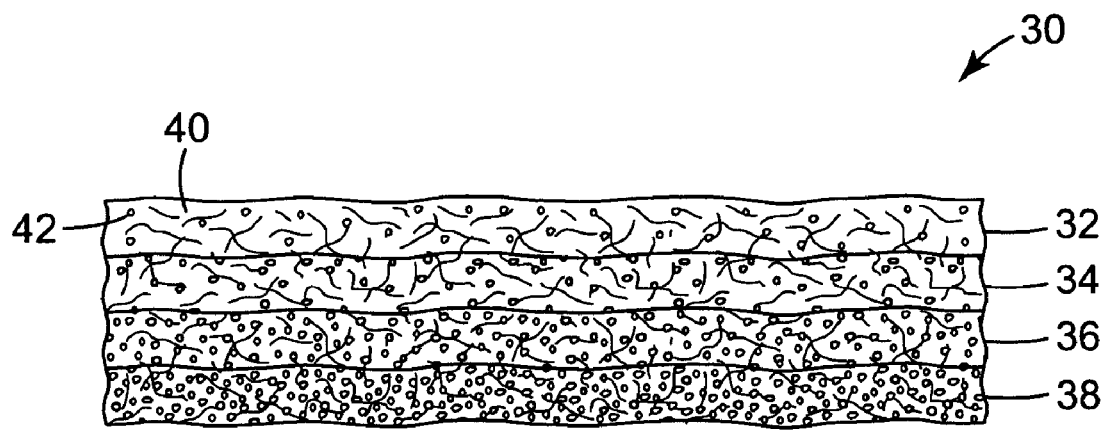
FIG. 3 shows a second exemplary embodiment of the present invention.

FIG. 3 shows a second exemplary embodiment of the present invention. Fire-protecting article 30 is formed of four layers 32, 34, 36, and 38 that are each preferably about one-half of an inch thick. Although fire-protecting article 30 is shown in FIG. 3 to have four layers 32, 34, 36, and 38, fire-protecting article 30 in accordance with the present invention may have any number of layers of any thickness, so long as the total initial thickness of fire-protecting article 30 is less than about three inches, and so long as fire-protecting article 30 meets the relevant standards and criteria. Furthermore, each layer 32, 34, 36, and 38 does not need to be the same thickness.

Layers 32, 34, 36, and 38 are comprised of noncombustible fibrous material 40 and intumescent material 42. Intumescent material 42 is dispersed throughout fibrous material 40. Fibrous material 40 is similar to fibrous material 24 of FIG. 2 and intumescent material 42 is similar to intumescent material 26 of FIG. 2. However, fire-protecting article 30 differs from fire-protecting article 20 because each layer 32, 34, 36, and 38 does not have substantially the same amount of intumescent material 42. In this embodiment, intumescent material 42 is dispersed in a gradient across the thickness of fire-protecting article 30, where each layer 32, 34, 36, and 38 has a different amount intumescent material 42. Specifically, first layer 32 has less intumescent material 42 than second layer 34, and second layer 34 has less intumescent material 42 than third layer 36, and third layer 36 has less intumescent material 42 than fourth layer 38. Intumescent material 42 may also be considered to be dispersed in a gradient so long as layer 32 and layer 38 do not contain the same amount of intumescent material 42. Thus, in alternate embodiments, layers 34 and 36 may contain the same amount of intumescent material. It is preferred that fourth layer 38 is aligned closest to a duct or any other heat source, and first layer 32 is furthest from the duct or any other heat source.

An optional fibrous material layer (not shown) may be placed next to first layer 32, where the additional fibrous material 40 layer does not contain any intumescent material 42. The additional fibrous material 40 layer may offer additional thermal protection without the need to handle extremely high temperatures, such as the temperatures that may be experienced by fourth layer 38. Just as with fire-protecting article 20, fire-protecting article 30 has an applied thickness of less than about three inches and expanded that is greater than the initial thickness when exposed to a temperature of preferably at or between about 500° F. to about 1200° F.

Fire-protecting article 30 of FIG. 3 may be formed using a similar method as that for fire-protecting article 20. However, the only difference would be that each layer 32, 34, 36, and 38 would not contain the same amount of intumescent material 42, but first layer 32 would contain less intumescent material 42 than fourth layer 38, such that intumescent material 42 is dispersed in a gradient across the thickness of the resulting fire-protecting article 30. In a suitable embodiment, fire-protecting article 30 includes about 0% to about 70% by weight of fiberglass, about 0% to about 70% by weight of mineral fibers, and about 30% to about 50% by weight of graphite. In another suitable embodiment, fire-protecting article 30 includes about 0% to about 70% by weight of fiberglass, about 0% to about 70% by weight of ceramic fibers, and about 30% to about 50% by weight of graphite.

Figure 4:
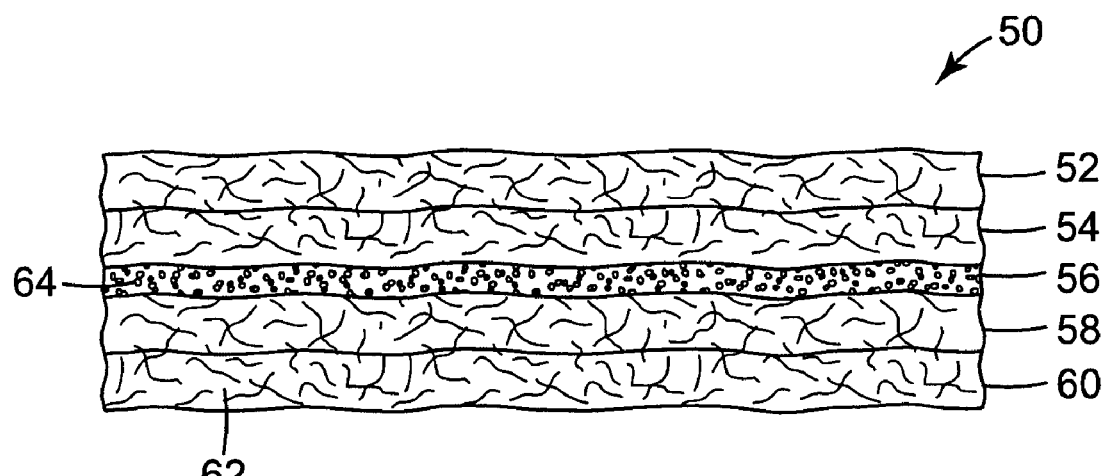
FIG. 4 shows a third exemplary embodiment of the present invention.

FIG. 4 shows a third exemplary embodiment of the present invention. Fire-protecting article 50 is formed of five layers 52, 54, 56, 58, and 60 that are each approximately 0.4 inches thick. Although fire-protecting article 50 is shown in FIG. 4 to have five layers 52, 54, 56, 58, and 60, fire-protecting article 50 in accordance with the present invention may have any number of layers of any thickness, so long as the total initial thickness of fire-protecting article 50 is less than about three inches, and so long as fire-protecting article 50 meets the relevant standards and criteria. Furthermore, each layer 52, 54, 56, 58, and 60 does not have to be the same thickness.

Layers 52, 54, 58, and 60 are comprised of noncombustible fibrous material 62. Layer 56 is a discrete layer comprised of intumescent material 64. Fibrous material 62 is similar to fibrous material 24 of FIG. 2 and intumescent material 64 is similar to intumescent material 26 of FIG. 2. However, fire-protecting article 50 differs from fire-protecting article 20 because intumescent material 64 is not dispersed throughout fibrous material 62, but is contained in a discrete layer 56. That is, intumescent material 64 is contained a layer that does not contain fibrous material 62. Intumescent material 64 may also be contained in more than one discrete layer 56. Furthermore, although FIG. 4 shows discrete layer 56 of intumescent material 64 in the middle of fire-protecting article 50, layer 56 may also be anywhere in fire-protecting article 50. For example, it may be preferred to place layer 56 closer to a side of fire-protecting article 50 that will be closest to a fire or other heat source so that intumescent material 64 may be exposed to a higher temperature and begin expanding earlier. Discrete layer 56 may also be used in combination with any of the other exemplary embodiments discussed above.

Just as with fire-protecting articles 20 and 30, fire-protecting article 50 has an applied thickness of less than about three inches and expanded thickness that is greater than the initial thickness when exposed to a temperature of preferably at or between about 500° F. to about 1200° F. Fire-protecting article 50 may still have a high level of integrity, even though the intumescent material is placed in discrete layer 56 rather than being dispersed throughout the fibrous material because if discrete layer of intumescent material 56 is placed between two layers of fibrous material (e.g., layers 54 and 58), the fibers of the adjacent layers of fibrous material 62 may also stretch apart when the intumescent material expands, thus expanding fire-protecting article 50.

Noncombustible fibrous layers 52, 54, 58, and 60 may be formed by first blending the desired fibers for the noncombustible fibrous material. Once again, a fiber blend does not have to be used and a single fiber may be used. The fibers or fiber blend are then carded onto a polypropylene scrim and weighed out to a desired amount. Any other type of scrim known in the art may also be used, and any other flat surface may also be used. Discrete layer of intumescent material 56 may be formed by first distributing a layer of noncombustible fibrous material and then distributing intumescent material 56. The layer of noncombustible fibrous material and the intumescent material 56 is then needled. The end result is a discrete layer of intumescent material 56 formed on the layer of noncombustible fibrous material. The thickness of the layer of noncombustible fibrous material used to form discrete layer of intumescent material 56 may vary. A thickness of discrete layer of intumescent material 56 is determined by the amount of intumescent material that fire-protecting article 50 should contain, which is determined by the expansion power of the type of intumescent material used. For example, if graphite is chosen as the type of intumescent material, a preferred amount of intumescent material that should be used is about 30% to about 50% by weight. Finally, layers 52, 54, 56, 58, and 60 may be arranged as desired (i.e., the placement of layer of intumescent material 58 may be placed in the middle of layers 52, 54, 58, and 60 or otherwise), and stitched together using a method known in the art. In a suitable embodiment, fire-protecting article 50 is formed of about 0% to about 70% by weight of fiberglass, about 0% to about 70% by weight of mineral fibers, and about 30% to about 50% by weight of graphite. In another suitable embodiment, fire-protecting article 50 includes about 0% to about 70% by weight of fiberglass, about 0% to about 70% by weight of ceramic fibers, and about 30% to about 50% by weight of graphite.

Although the present invention has been described with reference to preferred embodiments, workers skilled in the art will recognize that changes may be made in form and detail without departing from the spirit and scope of the invention.

The invention claimed is:

1. A method of fire protecting a duct comprising:
  fitting a non-self-supporting, flexible fire-protecting article around the duct in a single layer having an initial thickness and having an expanded reactive thickness of greater than or equal to about 3.5 inches,
    wherein the fire-protecting article comprises a noncombustible fibrous material and an intumescent material, and wherein the layer of the fire-protecting article meets the requirements of ASTM E2336 as specified in 2004; and,
  securing the fire-protecting article to the duct in a configuration wherein the article has room to expand outwardly to its expanded reactive thickness.

2. The method of claim 1, wherein the initial thickness of the article is less than about three inches.

3. The method of claim 1, wherein the initial thickness of the article is about one inch to about two inches.

4. The method of claim 1, comprising fitting the article around the duct such that a gap is not present between the duct and the article.

5. The method of claim 1, wherein the article is free of organic binder.

6. The method of claim 1, wherein the intumescent material is selected from the group consisting of graphite, sodium silicate, vermiculite, and blends thereof.

7. The method of claim 1, wherein the fire-protective article comprises 20-80% by weight of intumescent material.

8. The method of claim 1, wherein the noncombustible fibrous material is selected from a group consisting of mineral fibers, fiberglass, ceramic fibers, and blends thereof.

9. The method of claim 1, wherein the article is comprised of at least first and second layers.

10. The method of claim 1, wherein the intumescent material is dispersed in the article in a gradient.

11. A fire-protected duct comprising:
  a duct; and,
  a non-self-supporting, flexible fire-protecting article fitted around the duct and secured to the duct in a single layer,
    wherein the article comprises an initial thickness, and comprises an expanded reactive thickness of greater than or equal to about 3.5 inches,
    wherein the fire-protecting article comprises a noncombustible fibrous material and an intumescent material,
    wherein the layer of lire-protecting article meets the requirements of ASTM E2336 as specified in 2004,
    and wherein the fire-protecting article is secured to the duct in a configuration wherein the article has room to expand outwardly to its expanded reactive thickness.

12. The fire-protected duct of claim 11 wherein the fire-protected duct comprises a fire-rated duct assembly.

13. The fire-protected duct of claim 11, wherein the duct is selected from a group consisting of a grease duct, a chemical exhaust duct, and a heating, ventilation, and air conditioning duct.

14. The fire-protected duct of claim 11, wherein the initial thickness of the article is less than about three inches.

15. The tire-protected duct of claim 11, wherein the initial thickness of the article is about one inch to about two inches.

16. The fire-protected duct of claim 11, wherein the article is fitted around the duct such that a gap is not present between the duct and the article.

17. The fire-protected duct of claim 11, wherein the article is free of organic binder.

18. The fire-protected duct of claim 11, wherein the intumescent material is selected from the group consisting of graphite, sodium silicate, vermiculite, and blends thereof.

19. The tire-protected duct of claim 11, wherein the fire-protective article comprises 20-80% by weight of intumescent material.

20. The fire-protected duct of claim 11, wherein the noncombustible fibrous material is selected from a group consisting of mineral fibers, fiberglass, ceramic fibers, and blends thereof.

21. The fire-protected duct of claim 11, wherein the article is comprised of at least first and second layers.

22. The fire-protected duct of claim 11, wherein the intumescent material is dispersed in the article in a gradient.

* * * * *

UNITED STATES PATENT AND TRADEMARK OFFICE
CERTIFICATE OF CORRECTION

PATENT NO. : 8,178,177 B2  Page 1 of 1
APPLICATION NO. : 11/057277
DATED : May 15, 2012
INVENTOR(S) : George W. Frost It is certified that error appears in the above-identified patent and that said Letters Patent is hereby corrected as shown below:

Column 10
Line 21, before "material" delete "110".

Column 10
Line 51, delete "77." and insert -- 77 --, therefor.

Column 14
Line 13 (Approx.), In Claim 11, delete "lire-protecting" and insert -- fire-protecting --, therefor.

Column 14
Line 27 (Approx.), In Claim 15, delete "tire-protected" and insert -- fire-protected --, therefor.

Column 14
Line 37 (Approx.), In Claim 19, delete "tire-protected" and insert -- fire-protected --, therefor.

Signed and Sealed this
Twenty-seventh Day of November, 2012

David J. Kappos
*Director of the United States Patent and Trademark Office*